(12) United States Patent
Nakano (10) Patent No.: US 12,509,033 B2
(45) Date of Patent: Dec. 30, 2025

(54) HYDRAULIC PRESSURE CONTROL UNIT, BRAKE SYSTEM, AND STRADDLE-TYPE VEHICLE

(71) Applicant: Robert Bosch GmbH, Stuttgart (DE)

(72) Inventor: Ryoji Nakano, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 17/636,951

(22) PCT Filed: Aug. 14, 2020

(86) PCT No.: PCT/IB2020/057683
§ 371 (c)(1),
(2) Date: Feb. 21, 2022

(87) PCT Pub. No.: WO2021/038359
PCT Pub. Date: Mar. 4, 2021

(65) Prior Publication Data
US 2022/0274567 A1    Sep. 1, 2022

(30) Foreign Application Priority Data

Aug. 29, 2019 (JP) ................................. 2019-156226

(51) Int. Cl.
*B60T 8/17* (2006.01)
*B60T 13/14* (2006.01)
(Continued)

(52) U.S. Cl.
CPC ............ *B60T 8/1706* (2013.01); *B60T 13/14* (2013.01); *B60T 13/686* (2013.01); *B62L 3/023* (2013.01); *B60T 2270/10* (2013.01)

(58) Field of Classification Search
CPC . B60T 13/686; B60T 8/94; B60T 8/42; B60T 8/3675; B60T 8/4827;
(Continued)

(56) References Cited

U.S. PATENT DOCUMENTS 5,288,141 A * 2/1994 Isshiki .................... B60T 8/344
    303/119.3
6,132,011 A * 10/2000 Iwamura ................. B60T 8/368
    303/119.2
(Continued)

FOREIGN PATENT DOCUMENTS

EP         3312065 A1      4/2018
JP      2013193719 A       9/2013
(Continued)

OTHER PUBLICATIONS

EP 1396404 B1 (Year: 2009).*
(Continued)

*Primary Examiner* — Robert A. Siconolfi
*Assistant Examiner* — Mahbubur Rashid
(74) *Attorney, Agent, or Firm* — Michael Best & Friedrich LLP (57) ABSTRACT

A hydraulic pressure control unit (1) for a brake system mounted to a straddle-type vehicle includes a housing (40) that accommodates a circuit board (31). The housing (40) includes: a main body (41) formed with an opening (43*a*) in a region opposing the circuit board (31); a lid (48) that covers the opening (43*a*) and adheres to the main body (41); and a lid fixing section (50) provided in a space surrounded by the main body (41) and the lid (48) and fixing the lid (48) to the main body (41). The lid fixing section (50) includes: an engaged section (51) held by one of the main body (41) and the lid (48); and an engaging section (55) that is held by the other of the main body (41) and the lid (48) and engages with the engaged section (51).

11 Claims, 5 Drawing Sheets

(51) Int. Cl.
 *B60T 13/68* (2006.01)
 *B62L 3/02* (2006.01)

(58) Field of Classification Search
 CPC .... B60T 13/145; B60T 8/4031; B60T 8/1706; B60T 8/17613; B60T 2270/10; B60T 8/345; B60T 13/14; B62L 3/023
 See application file for complete search history.

(56) References Cited

U.S. PATENT DOCUMENTS

| | | | | |
|---|---|---|---|---|
| 6,354,674 B1* | 3/2002 | Iwamoto | ............. | F15B 13/0832 303/119.3 |
| 7,158,372 B2* | 1/2007 | Sanada | ................ | H05K 5/0247 439/246 |
| 8,112,196 B2* | 2/2012 | Takayanagi | ............ | H05K 1/144 361/752 |
| 9,033,729 B2* | 5/2015 | Klein | ...................... | H01R 13/62 439/549 |
| 9,056,596 B2* | 6/2015 | Nagashima | ............... | H05K 5/04 |
| 9,278,675 B2* | 3/2016 | Kodama | ................. | B60T 8/368 |
| 9,452,742 B2* | 9/2016 | Heise | ........................ | B60T 8/17 |
| 9,592,788 B2* | 3/2017 | Wiik | ..................... | B60R 21/233 |
| 9,925,970 B2* | 3/2018 | Heise | ..................... | B60T 13/20 |
| 2013/0033098 A1* | 2/2013 | Nagashima | ............. | B60T 7/042 361/752 |
| 2013/0033823 A1 | 2/2013 | Nagashima et al. | | |
| 2014/0285987 A1 | 9/2014 | Nagashima et al. | | |
| 2017/0084391 A1* | 3/2017 | Kodama | ............... | H01F 27/325 |
| 2018/0170333 A1* | 6/2018 | Sagayama | ............ | B60T 8/3675 |
| 2019/0061714 A1* | 2/2019 | Kaneko | .................. | B60T 8/173 |

FOREIGN PATENT DOCUMENTS

| | | |
|---|---|---|
| JP | 2014015077 A | 1/2014 |
| JP | 2017007461 A | 1/2017 |
| WO | 2019159029 A1 | 8/2019 |

OTHER PUBLICATIONS

JP 5025510 B2 (Year: 2012).*
EP 2700549 A1 (Year: 2014).*
DE 112017005991 T5 (Year: 2019).*
International Search Report and Written Opinion for Application No. PCT/IB2020/057683 dated Nov. 4, 2020 (10 pages).

* cited by examiner

HYDRAULIC PRESSURE CONTROL UNIT, BRAKE SYSTEM, AND STRADDLE-TYPE VEHICLE

BACKGROUND

The present invention relates to a hydraulic pressure control unit for a brake system mounted to a straddle-type vehicle, a brake system including the hydraulic pressure control unit, and a straddle-type vehicle including the brake system.

A conventional vehicle that includes a brake system for controlling a braking force on a wheel by controlling a hydraulic pressure of a brake fluid exists. Such a brake system includes a hydraulic pressure control unit. The hydraulic pressure control unit includes: a base body that is formed with a channel of the brake fluid; a circuit board that controls driving of a hydraulic pressure regulation valve opening/closing the channel of the brake fluid; and a housing that accommodates the circuit board. The housing includes: a main body that is connected to the base body; and a lid. In order to accommodate the circuit board in the housing, the main body is formed with an opening in a region that opposes the circuit board. This opening of the main body is covered with the lid. In the conventional hydraulic pressure control unit that includes the housing having such a main body and such a lid, a structure of fixing the lid to the main body is provided in a manner to be projected outward from outer peripheral portions of the main body and the lid (see JP-A-2017-007461).

SUMMARY

Here, compared to a vehicle such as a four-wheeled motor vehicle, a degree of freedom of part layout of a straddle-type vehicle that is one type of the vehicle is low, and a degree of freedom of mountability of the hydraulic pressure control unit therein is low. For such reasons, a demand for downsizing of the hydraulic pressure control unit that is mounted to the straddle-type vehicle has been increasing. However, in the conventional hydraulic pressure control unit, the structure of fixing the lid to the main body is provided in the manner to be projected outward from the outer peripheral portions of the main body and the lid as described above. Thus, there is a problem of a difficulty in downsizing of the hydraulic pressure control unit.

The present invention has been made with the above-described problem as the background and therefore has a purpose of obtaining a hydraulic pressure control unit that can be downsized in comparison with a conventional hydraulic pressure control unit. The present invention also has a purpose of obtaining a brake system that includes such a hydraulic pressure control unit. The present invention further has a purpose of obtaining a straddle-type vehicle that includes such a brake system.

A hydraulic pressure control unit according to the present invention is a hydraulic pressure control unit for a brake system mounted to a straddle-type vehicle and includes: a base body formed with a channel of a brake fluid; a circuit board that controls driving of a hydraulic pressure regulation valve opening/closing the channel; and a housing that is connected to the base body and accommodates a circuit board. The housing includes: a main body connected to the base body and formed with an opening in a region opposing the circuit board; a lid that covers the opening and adheres to the main body; and a lid fixing section provided in a space surrounded by the main body and the lid and fixing the lid to the main body. The lid fixing section includes: an engaged section held by one of the main body and the lid; and an engaging section that is held by the other of the main body and the lid and engages with the engaged section.

A brake system according to the present invention includes the hydraulic pressure control unit according to the present invention.

A straddle-type vehicle according to the present invention includes the brake system according to the present invention.

In the hydraulic pressure control unit according to the present invention, the lid fixing section, which fixes the lid to the main body, is provided in the space surrounded by the main body and the lid. Thus, the lid fixing section is not projected outward from outer peripheral portions of the main body and the lid. Therefore, it is possible to downsize the hydraulic pressure control unit according to the present invention to be smaller than the conventional hydraulic pressure control unit.

DETAILED DESCRIPTION

A description will hereinafter be made on a hydraulic pressure control unit, a brake system, and a straddle-type vehicle according to the present invention with reference to the drawings.

The following description will be made on a case where the present invention is adopted for a pedal-driven vehicle (for example, a two-wheeled vehicle, a three-wheeled vehicle, or the like). However, the present invention may be adopted for the straddle-type vehicle other than the pedal-driven vehicle. Examples of the straddle-type vehicle other than the pedal-driven vehicle are a two-wheeled motor vehicle, a three-wheeled motor vehicle, and an all-terrain vehicle, each of which has at least one of an engine and an electric motor as a drive source. The pedal-driven vehicle means a vehicle in general that can travel forward on a road by a depression force applied to pedals. That is, the pedal-driven vehicles include a normal pedal-driven vehicle, an electrically-assisted pedal-driven vehicle, an electric pedal-driven vehicle, and the like. Meanwhile, the two-wheeled motor vehicle and the three-wheeled motor vehicle each mean a so-called motorcycle, and the motorcycles include a bike, a scooter, an electric scooter, and the like.

A configuration, operation, and the like, which will be described below, constitute merely one example. Each of the hydraulic pressure control unit, the brake system, and the straddle-type vehicle according to the present invention is not limited to a case with such a configuration, such operation, and the like. For example, the following description will be made on a case where the hydraulic pressure control unit according to the present invention is a pumpless type. However, the hydraulic pressure control unit according to the present invention may include a pump that assists with a flow of a brake fluid. In addition, the following description will be made on a case where the brake system according to the present invention executes anti-lock brake control only for a braking force generated on a front wheel. However, the brake system according to the present invention may execute the anti-lock brake control only for a braking force generated on a rear wheel, or may execute the anti-lock brake control for both of the braking force generated on the front wheel and the braking force generated on the rear wheel.

In the drawings, the same or similar members or portions will be denoted by the same reference sign or will not be denoted by a reference sign. In addition, a detailed structure will appropriately be illustrated in a simplified manner or will not be illustrated. An overlapping description will appropriately be simplified or will not be made.

Mounting of Brake System to Pedal-Driven Vehicle

A description will be made on mounting of a brake system according to an embodiment to the pedal-driven vehicle.

Figure 1:
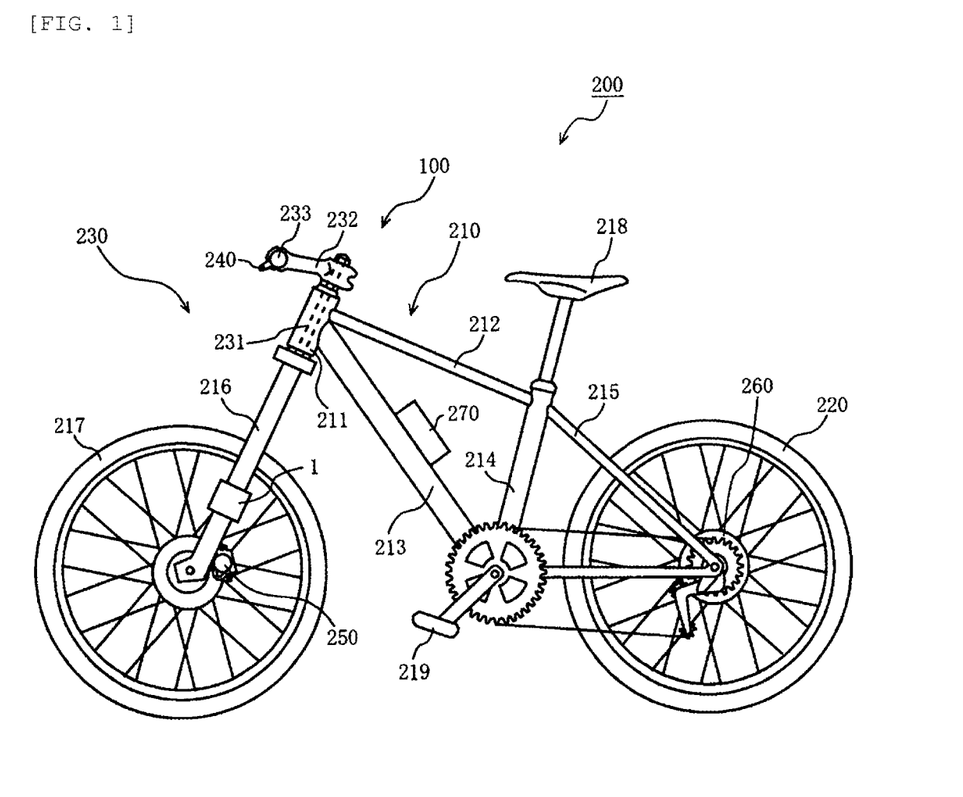
FIG. 1 is a view illustrating a schematic configuration of a pedal-driven vehicle to which a brake system according to an embodiment of the present invention is mounted.

FIG. 1 is a view illustrating a schematic configuration of the pedal-driven vehicle to which the brake system according to the embodiment of the present invention is mounted. FIG. 1 illustrates a case where a pedal-driven vehicle 200 is the two-wheeled vehicle. However, the pedal-driven vehicle 200 may be another pedal-driven vehicle such as the three-wheeled vehicle.

The pedal-driven vehicle 200 as an example of the straddle-type vehicle includes a frame 210, a turning section 230, a saddle 218, a pedal 219, a rear wheel 220, and a rear-wheel braking section 260.

For example, the frame 210 includes: a head tube 211 that pivotally supports a steering column 231 in the turning section 230; a top tube 212 and a down tube 213, each of which is coupled to the head tube 211; a seat tube 214 that is coupled to the top tube 212 and the down tube 213 and holds the saddle 218; and a stay 215 that is coupled to upper and lower ends of the seat tube 214 and holds the rear wheel 220 and the rear-wheel braking section 260.

The turning section 230 includes: the steering column 231; a handlebar stem 232 that is held by the steering column 231; a handlebar 233 that is held by the handlebar stem 232; a brake operation section 240 that is attached to the handlebar 233; a front fork 216 that is coupled to the steering column 231; a front wheel 217 that is held in a freely rotatable manner by the front fork 216; and a front-wheel braking section 250. The front fork 216 is provided to each side of the front wheel 217. One end of the front fork 216 is coupled to the steering column 231, and the other end thereof is connected to a center of rotation of the front wheel 217.

The brake operation section 240 includes: a mechanism that is used as an operation section of the front-wheel braking section 250; and a mechanism that is used as an operation section of the rear-wheel braking section 260. For example, the mechanism that is used as the operation section of the front-wheel braking section 250 is disposed on a right end side of the handlebar 233, and the mechanism that is used as the operation section of the rear-wheel braking section 260 is disposed on a left end side of the handlebar 233.

A hydraulic pressure control unit 1 is coupled to the front fork 216 of the turning section 230. The hydraulic pressure control unit 1 is a unit that controls a hydraulic pressure of a brake fluid for the front-wheel braking section 250. The rear-wheel braking section 260 may be a braking section of a type that generates a braking force by increasing the hydraulic pressure of the brake fluid, or may be a braking section of a type that mechanically generates the braking force (for example, a braking section of a type that generates the braking force by generating a tensile force to a wire, or the like).

For example, a power supply unit 270 that serves as a power supply for the hydraulic pressure control unit 1 is attached to the down tube 213 of the frame 210. The power supply unit 270 may be a battery or a generator. Examples of the generator are: a generator that generates electrical power by travel of the pedal-driven vehicle 200 (for example, a hub dynamo that generates the electrical power by rotation of the front wheel 217 or the rear wheel 220, a generator that also serves as a motor for a drive source of the front wheel 217 or the rear wheel 220 and generates regenerative power, or the like); and a generator that generates the electric power by sunlight.

That is, a brake system 100 is mounted to the pedal-driven vehicle 200, and the brake system 100 at least includes the brake operation section 240, the front-wheel braking section 250, the hydraulic pressure control unit 1, and the power supply unit 270. The brake system 100 can execute anti-lock brake control by controlling the hydraulic pressure of the brake fluid for the front-wheel braking section 250 with the hydraulic pressure control unit 1.

Configuration of Brake System

A description will be made on a configuration of the brake system according to the embodiment.

Figure 2:
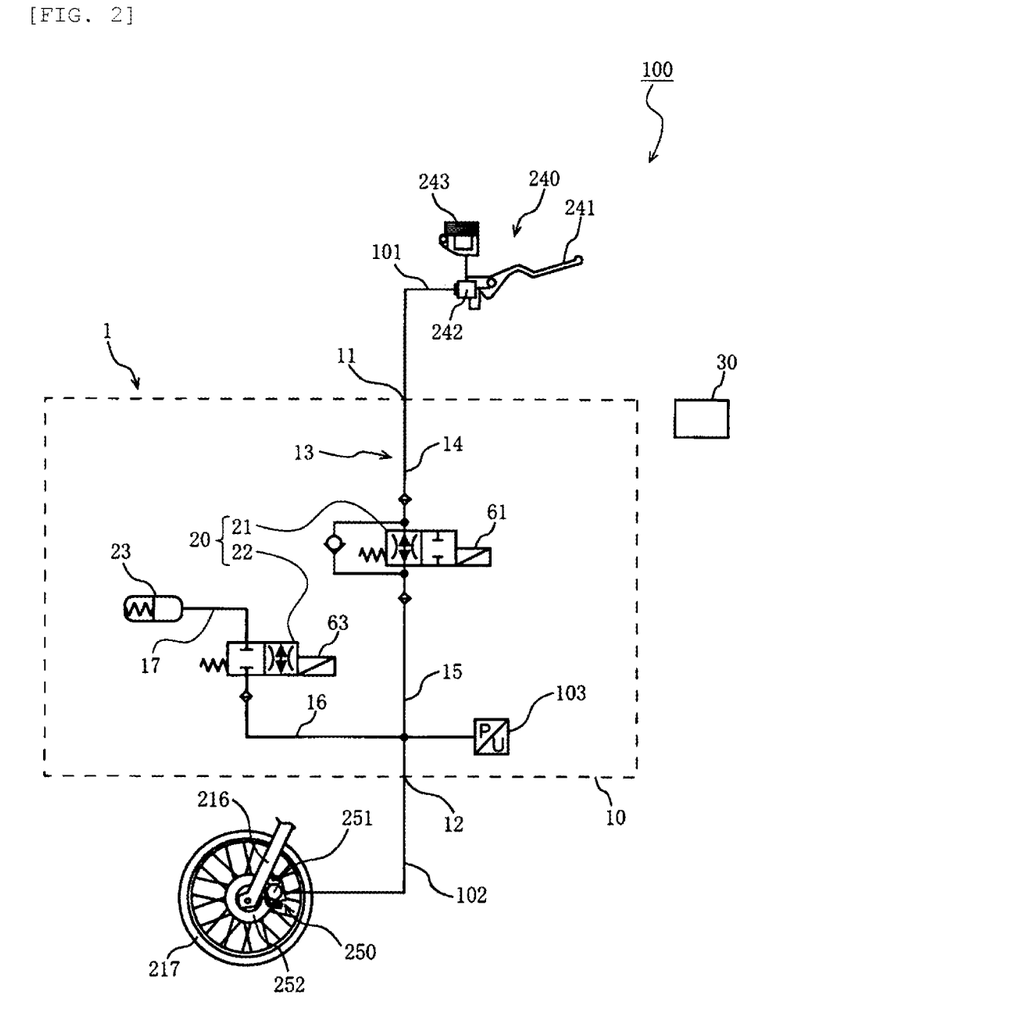
FIG. 2 is a view illustrating a schematic configuration of the brake system according to the embodiment of the present invention.

FIG. 2 is a view illustrating a schematic configuration of the brake system according to the embodiment of the present invention.

The hydraulic pressure control unit 1 includes a base body 10. The base body 10 is formed with a master cylinder port 11, a wheel cylinder port 12, and a channel 13 that communicates the master cylinder port 11 and the wheel cylinder port 12 with each other.

The channel 13 is a channel of the brake fluid. The channel 13 includes a first channel 14, a second channel 15, a third channel 16, and a fourth channel 17. The master cylinder port 11 and the wheel cylinder port 12 communicate with each other via the first channel 14 and the second channel 15. In addition, an end portion on an inlet side of the third channel 16 is connected to an intermediate portion of the second channel 15.

The brake operation section 240 is connected to the master cylinder port 11 via a fluid pipe 101. The brake operation section 240 includes a brake lever 241, a master cylinder 242, and a reservoir 243. The master cylinder 242 includes a piston section (not illustrated) that moves in an interlocking manner with an operation of the brake lever 241 by a user, and is connected to an inlet side of the first channel 14 via the fluid pipe 101 and the master cylinder port 11. With movement of the piston section, the hydraulic pressure of the brake fluid in the first channel 14 is increased or reduced. The reservoir 243 stores the brake fluid for the master cylinder 242.

The front-wheel braking section 250 is connected to the wheel cylinder port 12 via a fluid pipe 102. The front-wheel braking section 250 includes a wheel cylinder 251 and a rotor 252. The wheel cylinder 251 is attached to a lower end portion of the front fork 216. The wheel cylinder 251 includes a piston section (not illustrated) that moves in an interlocking manner with the hydraulic pressure in the fluid pipe 102, and is connected to an outlet side of the second channel 15 via the fluid pipe 102 and the wheel cylinder port 12. The rotor 252 is held by the front wheel 217 and rotates with the front wheel 217. When a brake pad (not illustrated) is pressed against the rotor 252 due to movement of the piston section, the front wheel 217 brakes.

The hydraulic pressure control unit 1 also includes a hydraulic pressure regulation valve 20 that opens/closes the channel 13. In this embodiment, the hydraulic pressure control unit 1 includes, as the hydraulic pressure regulation valves 20, an inlet valve 21 and an outlet valve 22. The inlet valve 21 is provided between an outlet side of the first channel 14 and an inlet side of the second channel 15 and allows/blocks a flow of the brake fluid between the first channel 14 and the second channel 15. The outlet valve 22 is provided between an outlet side of the third channel 16 and an inlet side of the fourth channel 17 and allows/blocks a flow of the brake fluid between the third channel 16 and the fourth channel 17. The hydraulic pressure of the brake fluid is controlled by opening/closing operation of each of the inlet valve 21 and the outlet valve 22.

The hydraulic pressure control unit 1 further includes a coil 61 for driving the inlet valve 21 and a coil 63 for driving the outlet valve 22. For example, when the coil 61 is in an unenergized state, the inlet valve 21 allows a bidirectional flow of the brake fluid. Then, when the coil 61 is energized, the inlet valve 21 is brought into a closed state and blocks the flow of the brake fluid. That is, in this embodiment, the inlet valve 21 is an electromagnetic valve that is opened when not energized. Meanwhile, for example, when the coil 63 is in an unenergized state, the outlet valve 22 blocks the flow of the brake fluid. Then, when the coil 63 is energized, the outlet valve 22 is brought into an open state and allows the bidirectional flow of the brake fluid. That is, in this embodiment, the outlet valve 22 is an electromagnetic valve that is closed when not energized.

The hydraulic pressure control unit 1 includes an accumulator 23. The accumulator 23 is connected to an outlet side of the fourth channel 17 and stores the brake fluid that has flowed through the outlet valve 22.

The hydraulic pressure control unit 1 includes a hydraulic pressure sensor 103 that detects the hydraulic pressure of the brake fluid in the wheel cylinder 251. The hydraulic pressure sensor 103 is provided to the second channel 15 or the third channel 16.

The hydraulic pressure control unit 1 includes a control section 30. The control section 30 receives signals from various sensors such as the hydraulic pressure sensor 103 and a wheel rotational frequency sensor (not illustrated) that detects a rotational frequency of the front wheel 217. Portions of the control section 30 maybe disposed collectively or may be disposed separately. The control section 30 may be configured to include a microcomputer, a microprocessor unit, or the like, may be configured to include a member in which firmware and the like can be updated, or may be configured to include a program module or the like that is executed by a command from a CPU or the like, for example.

The control section 30 controls the energization of the coil 61 and the coil 63. In detail, the control section 30 controls the energization of the coil 61 and thereby controls driving (the opening/closing operation) of the inlet valve 21. In addition, the control section 30 controls the energization of the coil 63 and thereby controls driving (the opening/closing operation) of the outlet valve 22. That is, by controlling the opening/closing operation of each of the inlet valve 21 and the outlet valve 22, the control section 30 controls the hydraulic pressure of the brake fluid in the wheel cylinder 251, that is, the braking force on the front wheel 217.

In this embodiment, of a configuration of the control section 30, at least a configuration to control the energization of the coil 61 and the coil 63 is governed by a circuit board 31, which will be described later. That is, by controlling the energization of the coil 61 and the coil 63, the circuit board 31 controls driving of the inlet valve 21 and the outlet valve 22.

For example, in the case where the control section 30 determines that the front wheel 217 is locked or possibly locked on the basis of the signal from the wheel rotational frequency sensor (not illustrated) at the time when the front wheel 217 brakes due to the operation of the brake lever 241 by the user, the control section 30 initiates the anti-lock brake control.

Once initiating the anti-lock brake control, the control section 30 brings the coil 61 into an energized state, closes the inlet valve 21, and blocks the flow of the brake fluid from the master cylinder 242 to the wheel cylinder 251, so as to prevent an increase in the hydraulic pressure of the brake fluid in the wheel cylinder 251. Meanwhile, the control section 30 brings the coil 63 into an energized state, opens the outlet valve 22, and allows the flow of the brake fluid from the wheel cylinder 251 to the accumulator 23, so as to reduce the hydraulic pressure of the brake fluid in the wheel cylinder 251. In this way, the front wheel 217 is unlocked, or locking thereof is avoided. In the case where the control section 30 determines, on the basis of the signal from the hydraulic pressure sensor 103, that the hydraulic pressure of the brake fluid in the wheel cylinder 251 is reduced to a specified value, the control section 30 brings the coil 63 into the unenergized state to close the outlet valve 22, and brings the coil 61 into the unenergized state to open the inlet valve 21 for a short period of time, so as to increase the hydraulic pressure of the brake fluid in the wheel cylinder 251. The control section 30 may increase/reduce the hydraulic pressure of the brake fluid in the wheel cylinder 251 only once or may repeatedly increase/reduce the hydraulic pressure of the brake fluid in the wheel cylinder 251 for a plurality of times.

When the anti-lock brake control is terminated and the brake lever 241 returns, the inside of the master cylinder 242 is brought into an atmospheric pressure state, and the brake fluid in the wheel cylinder 251 returns. In addition, when the anti-lock brake control is terminated and the brake lever 241 returns, the outlet valve 22 is brought into the open state. When the hydraulic pressure of the brake fluid in the channel 13 becomes lower than the hydraulic pressure of the brake fluid stored in the accumulator 23, the brake fluid that is stored in the accumulator 23 is discharged to the outside of the accumulator 23 without increasing the hydraulic pressure thereof (that is, in a pumpless manner), then returns into the channel 13, and eventually returns to the master cylinder 242.

Configuration of Hydraulic Pressure Control Unit

A description will be made on a configuration of the hydraulic pressure control unit for the brake system according to the embodiment.

As will be described later, the hydraulic pressure control unit 1 includes the base body 10 and a housing 40 that is connected to the base body 10. A description will hereinafter be made on a configuration of the hydraulic pressure control unit 1 while the hydraulic pressure control unit 1 in such a state that the housing 40 is arranged on the base body 10 is observed.

Figure 3:
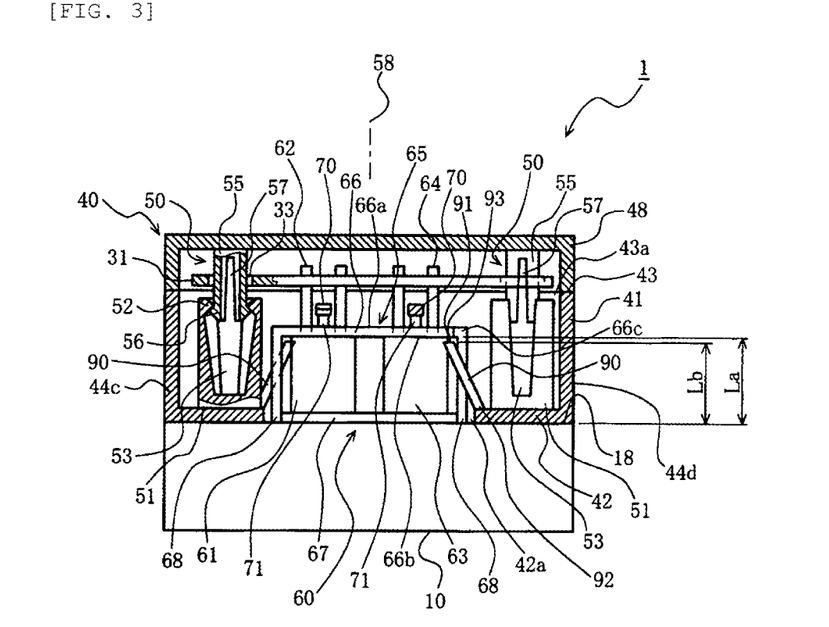
FIG. 3 is a view in which inside of a hydraulic pressure control unit according to the embodiment of the present invention is observed laterally.
Figure 4:
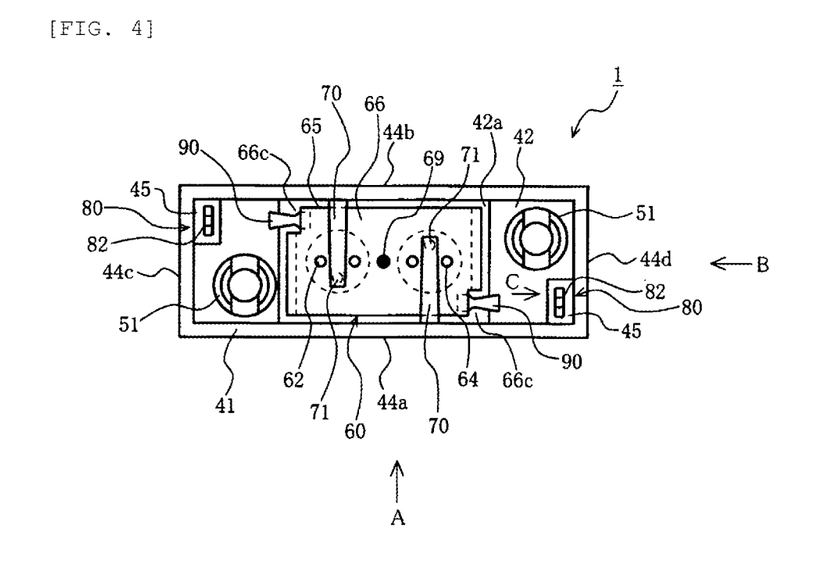
FIG. 4 is a view of in which the inside of the hydraulic pressure control unit according to the embodiment of the present invention is observed from above.

FIG. 3 is a view in which the inside of the hydraulic pressure control unit according to the embodiment of the present invention is observed laterally. In detail, FIG. 3 is a view in which the hydraulic pressure control unit 1 is observed in an arrow A direction illustrated in FIG. 4, and is a view in which the hydraulic pressure control unit 1 is observed while a portion on a front surface side of the housing 40 in the arrow A direction is eliminated. That is, FIG. 3 is a view in which the inside of the hydraulic pressure control unit 1 in such a state that the housing 40 is arranged on the base body 10 is observed laterally. Here, FIG. 4 illustrates a pair of connecting sections 80. In FIG. 3, the connecting section 80 that is illustrated on a right side of the sheet of FIG. 4 is not illustrated. In addition, in FIG. 3, a part of one of plural lid fixing sections 50 and a part of the circuit board 31 are illustrated in a cross section.

FIG. 4 is a view in which the inside of the hydraulic pressure control unit according to the embodiment of the present invention is observed from above. In detail, FIG. 4 is a view in which the hydraulic pressure control unit 1 in such a state that a lid 48 of the housing 40 and the circuit board 31 are removed is observed from above.

Figure 5:
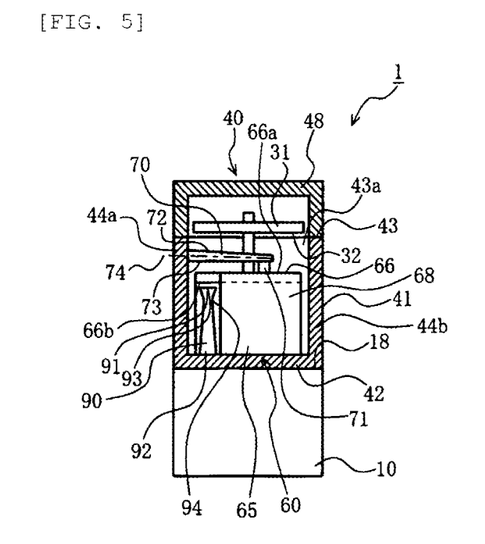
FIG. 5 is a view in which the inside of the hydraulic pressure control unit according to the embodiment of the present invention is observed laterally.

FIG. 5 is a view in which the inside of the hydraulic pressure control unit according to the embodiment of the present invention is observed laterally. In detail, FIG. 5 is a view in which the hydraulic pressure control unit 1 is observed in an arrow B direction illustrated in FIG. 4, and is a view in which the hydraulic pressure control unit 1 is observed while a portion on a front surface side of the housing 40 in the arrow B direction is eliminated. That is, FIG. 5 is a view in which the inside of the hydraulic pressure control unit 1 in such a state that the housing 40 is arranged on the base body 10 is observed laterally. In FIG. 5, the lid fixing section 50 and the connecting section 80 that are located in front of a coil unit 60 in the arrow B direction in FIG. 4 are not illustrated.

Figure 6:
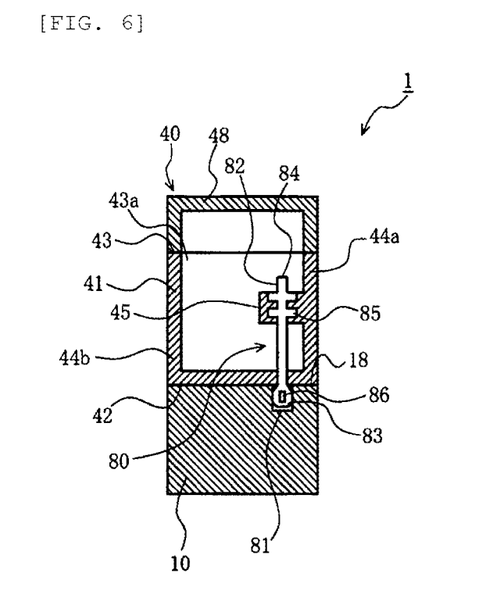
FIG. 6 is a view in which the inside of the hydraulic pressure control unit according to the embodiment of the present invention is observed laterally.

FIG. 6 is a view in which the inside of the hydraulic pressure control unit according to the embodiment of the present invention is observed laterally. In detail, FIG. 6 is a view in which the connecting section 80 of the hydraulic pressure control unit 1 is observed in an arrow C direction illustrated in FIG. 4. That is, FIG. 6 is a view in which the inside of the hydraulic pressure control unit 1 in such a state that the housing 40 is arranged on the base body 10 is observed laterally.

A description will herein be made on the configuration of the hydraulic pressure control unit 1 according to this embodiment with reference to FIG. 3 to FIG. 6.

The hydraulic pressure control unit 1 includes the base body 10, the housing 40, the coil unit 60, and the circuit board 31.

The base body 10 is a substantially rectangular-parallelepiped member, and an aluminum alloy is used as a material therefor, for example. The housing 40 is connected to an upper surface 18 of the base body 10. In this embodiment, the housing 40 is connected to the upper surface 18 of the base body 10 by adhesion. It is possible to improve airtightness between the base body 10 and the housing 40 by connecting the base body 10 and the housing 40 by the adhesion. Each of the surfaces of the base body 10 may be flat, may include a curved portion, or may include a step.

For example, the housing 40 has a substantially rectangular-parallelepiped box shape. In this embodiment, the housing 40 is formed of a resin. That is, the housing 40 is a resin molded product. The housing 40 accommodates the coil unit 60 and the circuit board 31 therein. The housing 40 according to this embodiment includes a main body 41 and the lid 48. A lower surface portion 42 of the main body 41 is connected to the upper surface 18 of the base body 10 by the adhesion. A region of the main body 41 that opposes the circuit board 31 is formed with an opening 43a. In this embodiment, the opening 43a is formed in an upper surface portion 43 of the main body 41. The lid 48 is a member that covers the opening 43a of the main body 41. In this embodiment, the lid 48 is connected to the main body 41 by adhesion. In detail, a lower surface portion of the lid 48 adheres to a peripheral edge of the opening 43a in the upper surface portion 43 of the main body 41. It is possible to improve airtightness between the lid 48 and the main body 41 by connecting the lid 48 and the main body 41 by the adhesion.

The coil unit 60 includes the coils for driving the hydraulic pressure regulation valves 20. That is, the coil unit 60 includes the coil 61 and the coil 63. The coil unit 60 also includes a coil housing 65 that holds the coil 61 and the coil 63. In this embodiment, the coil housing 65 includes: an upper surface portion 66 that is arranged above the coil 61 and the coil 63; a lower surface portion 67 that is arranged below the coil 61 and the coil 63; and a side surface portion 68 that connects the upper surface portion 66 and the lower surface portion 67. In this embodiment, of corners of the upper surface portion 66 of the coil housing 65, the corner near a placement table 90, which will be described later, is formed with a notch 66c. The side surface portion 68 of the coil housing 65 connects a portion of the upper surface portion 66 that is not formed with the notch 66c and the lower surface portion 67.

This coil unit 60 is connected to the upper surface 18 of the base body 10. In this embodiment, the coil unit 60 is connected to the upper surface 18 of the base body 10 by adhesion. More specifically, in the lower surface portion 42 of the main body 41 of the housing 40, an opening 42a is formed at a position that opposes the coil unit 60. The coil unit 60 passes the opening 42a in the lower surface portion 42 of the main body 41. Then, the lower surface portion 67 of the coil housing 65 is connected to the upper surface 18 of the base body 10 by the adhesion.

The circuit board 31 is arranged above the coil unit 60. The circuit board 31 is electrically connected to a connection terminal 62 of the coil 61 and a connection terminal 64 of the coil 63. In this way, the circuit board 31 is configured to be able to control the energization of the coil 61 and the coil 63.

Here, as illustrated in FIG. 3 to FIG. 5, the hydraulic pressure control unit 1 according to this embodiment includes at least one arm 70 that is made of a resin. In this embodiment, an example in which the two arms 70 are provided will be described. One end of one of these arms 70 is held by a first side surface portion 44a that is one of side surface portions of the main body 41 of the housing 40. Meanwhile, one end of the other of these arms 70 is held by a second side surface portion 44b that is the side surface portion opposing the first side surface portion 44a in the main body 41. Then, these arms 70 are in contact with an upper surface 66a of the upper surface portion 66 of the coil housing 65. In other words, these arms 70 are in contact with a surface of the coil unit 60 that opposes an adhered surface to the base body 10. Each of the arms 70 according to this embodiment includes a projection 71 that is projected downward at a position near an end portion on an opposite side from the end held by the housing 40. Then, the projection 71 is in contact with the upper surface 66a of the upper surface portion 66 of the coil housing 65. That is, in this embodiment, the projection 71 is a contact portion of the arm 70 with the coil unit 60.

In detail, the arm 70 is configured that the projection 71 thereof is pushed upward by the upper surface 66a of the upper surface portion 66 of the coil housing 65 and is thereby elastically deformed immediately after the hydraulic pressure control unit 1 is assembled, that is, in a state where an adhesive that sticks the base body 10 and the coil unit 60 is not solidified. Accordingly, in the state where the adhesive that sticks the base body 10 and the coil unit 60 is not solidified, the coil unit 60 can be pressed toward the base body 10 by a reaction force of the arm 70. As a result, in the hydraulic pressure control unit 1 according to this embodiment, the coil unit 60 can be fixed to the base body 10 by the adhesion. Thus, in the hydraulic pressure control unit 1 according to this embodiment, the coil unit 60 can be fixed to the base body 10 by the adhesion without using a bolt as a fastening member, that is, in a boltless manner. In the hydraulic pressure control unit 1 according to this embodiment, the coil unit 60 can be fixed to the base body 10 in the boltless manner. As a result, there is no need to secure an arrangement space for the bolt in the coil unit 60. Therefore, the coil unit 60 can be downsized, and thus the hydraulic pressure control unit 1 can be downsized.

By the way, the one end of the arm 70 is held by the housing 40. For this reason, the reaction force of the arm 70 also acts as a force that separates the housing 40 and the base body 10 in a connected portion between the housing 40 and the base body 10. Thus, in the case where the arm 70 is adopted, it may be concerned that adhered portions of the housing 40 and the base body 10 separate from each other, which deteriorates the airtightness between the housing 40 and the base body 10. However, the arm 70 according to this embodiment is formed of the resin. Accordingly, due to a creep phenomenon, a pressing force of the arm 70 against the coil unit 60 is reduced over time. In addition, a progression of the creep phenomenon is influenced by a surrounding temperature. Thus, when a temperature in the housing 40 is increased due to heat generation by the circuit board 31, the coil 61, and the coil 63, the creep phenomenon is promoted, which tends to reduce the pressing force of the arm 70 against the coil unit 60. For this reason, in the hydraulic pressure control unit 1 according to this embodiment, after a lapse of a certain amount of time, the pressing force of the arm 70 against the coil unit 60 is reduced to such a magnitude that the adhered portions of the housing 40 and the base body 10 do not separate from each other. Therefore, in the hydraulic pressure control unit 1 according to this embodiment, it is possible to suppress the separation of the adhered portions of the housing 40 and the base body 10 and thus possible to suppress the deterioration of the airtightness between the housing 40 and the base body 10.

Here, in the housing 40, portions that hold the arms 70 are not limited to the first side surface portion 44a and the second side surface portion 44b of the main body 41. For example, the one end of the arm 70 may be held by each of a third side surface portion 44c and a fourth side surface portion 44d, each of which is the side surface portion connecting the first side surface portion 44a and the second side surface portion 44b in the main body 41. Alternatively, for example, the one end of each of the arms 70 may be held by the lower surface portion 42 of the main body 41.

In addition, as illustrated in FIG. 5, in this embodiment, the arm 70 is arranged between the coil unit 60 and the circuit board 31. An upper surface 72 of the arm 70 is inclined with respect to a lower surface 32 of the circuit board 31. In other words, in an observing direction that is perpendicular to an alignment direction of the coil unit 60, the arm 70, and the circuit board 31, a surface of the arm 70 that opposes the circuit board 31 is inclined with respect to a surface of the circuit board 31 that opposes the arm 70. When the arm 70 has such a shape, compared to a case where the upper surface 72 of the arm 70 is parallel with the lower surface 32 of the circuit board 31, a space between the arm 70 and the circuit board 31 is increased, and an area of the circuit board 31 where electronic components and the like are mounted can be expanded. In this embodiment, the upper surface 72 of the arm 70 is an inclined surface that has a linear shape in a side view. However, the upper surface 72 of the arm 70 may be an inclined surface that has a curved shape in the side view, or may be an inclined surface that has a step shape in the side view. As long as the upper surface 72 of the arm 70 is inclined with respect to the lower surface 32 of the circuit board 31, the area of the circuit board 31 where the electronic components and the like are mounted can be expanded.

In addition, as illustrated in FIG. 5, an axis 74 of the arm 70 is inclined with respect to the lower surface 32 of the circuit board 31. The axis 74 of the arm 70 is also inclined with respect to the upper surface 66a of the upper surface portion 66 of the coil housing 65. In other words, in the observing direction that is perpendicular to the alignment direction of the coil unit 60, the arm 70, and the circuit board 31, the axis 74 of the arm 70 is inclined with respect to the surface of the circuit board 31 that opposes the coil unit 60 and the surface of the coil unit 60 that opposes the circuit board 31. The axis 74 of the arm 70 is an imaginary line that connects points at an equal distance from both of the upper surface 72 and a lower surface 73 from the one end to the other end of the arm 70.

By arranging the axis 74 of the arm 70, just as described, for example, as illustrated in FIG. 5, the upper surface 72 of the arm 70 can be inclined with respect to the lower surface 32 of the circuit board 31. In the case where the upper surface 72 of the arm 70 is inclined with respect to the lower surface 32 of the circuit board 31, compared to the case where the upper surface 72 of the arm 70 is parallel with the lower surface 32 of the circuit board 31, the space between the arm 70 and the circuit board 31 is increased, and the area of the circuit board 31 where the electronic components and the like are mounted can be expanded. In addition, for example, by arranging the axis 74 of the arm 70 as described above, the lower surface 73 of the arm 70 can be inclined with respect to the upper surface 66a of the upper surface portion 66 of the coil housing 65. When the lower surface 73 of the arm 70 is inclined with respect to the upper surface 66a of the upper surface portion 66 of the coil housing 65, compared to a case where the lower surface 73 of the arm 70 is parallel with the upper surface 66a of the upper surface portion 66 of the coil housing 65, a space between the arm 70 and the coil unit 60 is increased, and an accommodating area for accommodated components in the housing 40 can be expanded.

The arm 70 and the main body 41 of the housing 40 are an integrated resin molded product. Accordingly, in the hydraulic pressure control unit 1 according to this embodiment, it is possible to eliminate an assembly process of the arm 70 to the main body 41 and thus to reduce assembly man-hours.

In addition, the plural arms 70 are provided. Thus, compared to a case where the single arm 70 presses the coil unit 60, it is possible to firmly press the coil unit 60. As a result, due to the provision of the plural arms 70, reliability of the adhesion between the base body 10 and the coil unit 60 is improved.

Furthermore, in this embodiment, as illustrated in FIG. 4, the two arms 70 are in contact with the coil unit 60 at positions that are point symmetric about a center 69 of the coil unit 60. In other words, in this embodiment, in an observing direction that is parallel with an alignment direction of the coil unit 60 and the arm 70, at least two of the plural arms 70 are in contact with the coil unit 60 at the positions that are point symmetric about the center 69 of the coil unit 60. Thus, locational variations in a load that is applied from the arm 70 to the coil unit 60 are reduced, and the reliability of the adhesion between the base body 10 and the coil unit 60 is improved.

As illustrated in FIG. 3 and FIG. 4, the hydraulic pressure control unit 1 according to this embodiment includes the at least one lid fixing section 50 for fixing the lid 48 to the main body 41 of the housing 40. In this embodiment, an example in which the two lid fixing sections 50 are provided will be described. Each of the lid fixing sections 50 is provided in a space that is surrounded by the main body 41 and the lid 48. The lid fixing section 50 includes: an engaged section 51; and an engaging section 55 that engages with the engaged section 51. The engaged section 51 is held by one of the main body 41 and the lid 48. The engaging section 55 is held by the other of the main body 41 and the lid 48. In this embodiment, an example in which the engaged section 51 is held by the main body 41, and the engaging section 55 is held by the lid 48 will be described. In this embodiment, of components that engage with each other at the time when the lid 48 is fixed to the main body 41, the component having higher rigidity is set as the engaged section 51, and the component having lower rigidity is set as the engaging section 55.

In the conventional hydraulic pressure control unit, the structure of fixing the lid to the main body is provided in the manner to be projected outward from the outer peripheral portions of the main body and the lid. Thus, it is difficult to downsize the hydraulic pressure control unit. Meanwhile, the lid fixing section 50 is provided in the space that is surrounded by the main body 41 and the lid 48. Thus, the lid fixing section 50 is not projected outward from outer peripheral portions of the main body 41 and the lid 48. Therefore, it is possible to downsize the hydraulic pressure control unit 1 to be smaller than the conventional hydraulic pressure control unit by fixing the lid 48 to the main body 41 using the lid fixing section 50. In addition, after the assembly of the hydraulic pressure control unit 1 is completed, the lid fixing section 50 cannot be seen from the outside of the hydraulic pressure control unit 1. Thus, it is possible to improve design of the hydraulic pressure control unit 1. Furthermore, the lid 48 can be fixed to the main body 41 in the boltless manner. Thus, compared to the case where the lid 48 is fixed to the main body 41 by using the bolt, it is possible to reduce the assembly man-hours of the hydraulic pressure control unit 1 according to this embodiment.

As a specific structure of the engaged section 51 and the engaging section 55 in the lid fixing section 50, any of various structures adopted for the conventional snap-fit structure can be adopted. In this embodiment, the following structure is adopted for the engaged section 51 and the engaging section 55.

The engaged section 51 has a tubular shape such as a substantially cylindrical shape. The engaging section 55 has a pillared shape such as a substantially columnar shape. The engaging section 55 extends to the inside of the engaged section 51 and engages with the engaged section 51 from the inside. In detail, a projection 52 that bulges to the inside is provided on an inner peripheral side of the engaged section 51. Meanwhile, a projection 56 that bulges to the outside of the engaging section 55 is provided to, for example, a tip of the engaging section 55. The engaging section 55 engages with the engaged section 51 from the inside when the projection 56 is hooked on the projection 52 of the engaged section 51.

In this embodiment, the circuit board 31 is formed with a hole 33, and the lid fixing section 50 penetrates the hole 33 of the circuit board 31. In the case where the lid fixing section 50 does not penetrate the hole 33 of the circuit board 31, the lid fixing section 50 is arranged on an outer peripheral side of the circuit board 31. Accordingly, when the lid fixing section 50 penetrates the hole 33 of the circuit board 31, compared to the case where the lid fixing section 50 is arranged on the outer peripheral side of the circuit board 31, the hydraulic pressure control unit 1 can be downsized.

In this embodiment, the hole 33 of the circuit board 31 serves as a position reference hole of the circuit board 31. The position reference hole is a hole at a reference position when the electronic components are mounted to the circuit board 31, and is always formed in the circuit board 31. Since the lid fixing section 50 penetrates the position reference hole, a dedicated hole that is penetrated by the lid fixing section 50 is no longer needed in the circuit board 31. Accordingly, when the lid fixing section 50 penetrates the position reference hole, compared to a case where the dedicated hole that is penetrated by the lid fixing section 50 is formed in the circuit board 31, the circuit board 31 can be downsized, and thus the hydraulic pressure control unit 1 can be downsized.

In this embodiment, the engaging section 55 of the lid fixing section 50 penetrates the hole 33 of the circuit board 31. The engaging section 55 can be formed to be thinner than the engaged section 51. Accordingly, when it is configured that the engaging section 55 penetrates the hole 33 of the circuit board 31, compared to a configuration that the engaged section 51 penetrates the hole 33 of the circuit board 31, the hole 33 can be formed to be small. Thus, the circuit board 31 can be downsized, and the hydraulic pressure control unit 1 can thereby be downsized.

In this embodiment, the engaged section 51 and the engaging section 55 are configured to be elastically deformed. More specifically, the engaged section 51 is formed with a slit 53 that extends from a tip to abase side held by the main body 41. As a result, the engaged section 51 is divided into two pillared portions. In the case where the engaged section 51 is configured just as described, the engaged section 51 can elastically be deformed such that a tip portion of the engaged section 51 expands outward at the time when the engaging section 55 is inserted in the engaged section 51. The engaged section 51 may be divided into the three or more pillared portions. The engaging section 55 is formed with a slit 57 that extends from a tip to a base side held by the lid 48. As a result, the engaging section 55 is divided into two pillared portions. In the case where the engaging section 55 is configured just as described, the engaging section 55 can elastically be deformed such that a tip portion of the engaging section 55 is narrowed inward at the time when the engaging section 55 is inserted in the engaged section 51. The engaging section 55 maybe divided into the three or more pillared portions.

There is a case where, when the hydraulic pressure control unit 1 is being assembled, a position of the engaging section 55 with respect to the engaged section 51 is misaligned with a prescribed position due to an assembly error of the component of the hydraulic pressure control unit 1, or the like. Even in such a case, as long as the engaged section 51 and the engaging section 55 are configured to be elastically deformed, the engaging section 55 can engage with the engaged section 51 while the assembly error is offset by the engaged section 51 and the engaging section 55. Thus, when the engaged section 51 and the engaging section 55 are configured to be elastically deformed, the hydraulic pressure control unit 1 can easily be assembled. As long as the engaged section 51 and the engaging section 55 are configured to be elastically deformed, the engaging section 55 can engage with the engaged section 51 while the assembly error is offset by the engaged section 51 and the engaging section 55. Thus, the hydraulic pressure control unit 1 can easily be assembled. However, in the case where both of the engaged section 51 and the engaging section 55 are configured to be elastically deformed, compared to a configuration that one of the engaged section 51 and the engaging section 55 is elastically deformed, the further significant assembly error can be offset. Therefore, the hydraulic pressure control unit 1 can easily be assembled.

In this embodiment, the engaged section 51 of the lid fixing section 50 and the main body 41 of the housing 40 are an integrated resin molded product. Accordingly, in the hydraulic pressure control unit 1 according to this embodiment, it is possible to eliminate an assembly process of the engaged section 51 to the main body 41 and thus to reduce the assembly man-hours. In the case of a configuration that the engaged section 51 is held by the lid 48, the engaged section 51 and the lid 48 are formed as an integrated resin molded product. In this way, it is possible to reduce the assembly man-hours of the hydraulic pressure control unit 1. In addition, in this embodiment, the engaging section 55 of the lid fixing section 50 and the lid 48 of the housing 40 are an integrated resin molded product. Accordingly, in the hydraulic pressure control unit 1 according to this embodiment, it is possible to eliminate an assembly process of the engaging section 55 to the lid 48 and thus to reduce the assembly man-hours. In the case of a configuration that the engaging section 55 is held by the main body 41, the engaging section 55 and the main body 41 are formed as an integrated resin molded product. In this way, it is possible to reduce the assembly man-hours of the hydraulic pressure control unit 1.

In this embodiment, the hydraulic pressure control unit 1 includes the plural lid fixing sections 50. Accordingly, in this embodiment, the lid 48 is fixed to the main body 41 at two or more positions. Thus, when the lid 48 is fixed to the main body 41 by using the lid fixing sections 50, it is possible to position the lid 48 with respect to the main body 41. Therefore, due to the provision of the plural lid fixing sections 50, the hydraulic pressure control unit 1 can easily be assembled.

The hydraulic pressure control unit 1 according to this embodiment includes the plural lid fixing sections 50 and thus is configured that the lid 48 cannot be fixed to the main body 41 in a wrong direction. When the hydraulic pressure control unit 1 is configured just as described, it is possible to prevent erroneous attachment of the lid 48. Thus, the hydraulic pressure control unit 1 can easily be assembled. More specifically, an imaginary axis that is parallel with a penetrating direction of the opening 43*a* of the main body 41 in the housing 40 is set as an imaginary axis 58. In the case where the imaginary axis 58 is defined just as described, it is configured that, when the lid 48 is rotated 180° from a correct attachment position with the imaginary axis 58 being a center of rotation, the engaging section 55 of at least one of the plural lid fixing sections 50 does not engage with any of the engaged sections 51 of the plural lid fixing sections 50. Such a configuration can be achieved, for example, when at least two of the plural lid fixing sections 50 are arranged at positions that are not point symmetric about the imaginary axis 58. In addition, for example, such a configuration can be achieved when, in at least two of the plural lid fixing sections 50, a pair of the engaged section 51 and the engaging section 55 is formed in different size from the other pair of the engaged section 51 and the engaging section 55.

As illustrated in FIG. 4 and FIG. 6, the hydraulic pressure control unit 1 according to this embodiment includes the at least one connecting section 80 that connects the base body 10 and the housing 40. In this embodiment, an example in which the two connecting sections 80 are provided will be described. As described above, the housing 40 according to this embodiment includes the main body 41 and the lid 48. Thus, in this embodiment, the connecting section 80 connects the base body 10 and the main body 41 of the housing 40. The connecting section 80 includes a recess 81 that is formed in the base body 10. In the hydraulic pressure control unit 1 according to this embodiment, the main body 41 of the housing 40 is connected to the upper surface 18 of the base body 10. Accordingly, in this embodiment, the recess 81 is formed in a shape that is recessed downward from the upper surface 18 of the base body 10. The connecting section 80 also includes a pin 82 which is held by the main body 41 of the housing 40 and a lower end portion 83 of which is press-inserted in the recess 81. That is, it is configured that, when the lower end portion 83 of the pin 82, which is held by the main body 41 of the housing 40, is press-inserted in the recess 81 of the base body 10, the base body 10 and the main body 41 of the housing 40 are connected.

As a configuration to connect the base body and the housing in the conventional hydraulic pressure control unit, connection by the bolt as the fastening member has been known. Here, the bolt includes: a male screw formed section that is formed with a male screw; and a head to which a tool is connected. In the case where a width of the bolt in a perpendicular direction to an axial direction of the bolt is set as a lateral width, a lateral width of the head is greater than a lateral width of the male screw formed section. For this reason, it is necessary to secure an arrangement space for the large head of the bolt, which connects the housing and the base body. Thus, it is difficult to downsize the conventional hydraulic pressure control unit. Meanwhile, in the hydraulic pressure control unit 1 according to this embodiment, the base body 10 and the main body 41 of the housing 40 can be connected without using the bolt (in the boltless manner). Thus, there is no need to secure the arrangement space for the head of the bolt. Therefore, it is possible to downsize the hydraulic pressure control unit 1 according to this embodiment to be smaller than the conventional hydraulic pressure control unit.

In the hydraulic pressure control unit 1 according to this embodiment, as described above, the main body 41 of the housing 40 adheres to the base body 10. Accordingly, in the hydraulic pressure control unit 1 according to this embodiment, in the case where the force that separates the main body 41 of the housing 40 from the base body 10 acts, such a force can be received by an adhesive force of the adhesive that sticks the base body 10 and the main body 41 of the housing 40 in addition to the connecting section 80. Thus, when it is configured that the main body 41 of the housing 40 adheres to the base body 10, compared to a configuration that the main body 41 of the housing 40 does not adhere to the base body 10, it is possible to thin the pin 82 of the connecting section 80 and thus to downsize the hydraulic pressure control unit 1.

In this embodiment, the hydraulic pressure control unit 1 includes the plural connecting sections 80. Accordingly, in this embodiment, the main body 41 of the housing 40 is fixed to the base body 10 at two or more positions. Thus, when the main body 41 of the housing 40 is fixed to the base body 10 by using the connecting sections 80, it is possible to position the main body 41 of the housing 40 with respect to the base body 10. Therefore, due to the provision of the plural connecting sections 80, the hydraulic pressure control unit 1 can easily be assembled.

A material for the pin 82 is not particularly limited. The pin 82 may be formed of a resin, or the pin 82 may be formed of metal. In the case of the resinous pin 82, it is possible to reduce the assembly man-hours of the hydraulic pressure control unit 1 by forming the pin 82 as an integrated molded product with the housing 40. Meanwhile, the creep phenomenon does not occur to the metallic pin 82. Thus, in the case of the metallic pin 82, it is possible to suppress a reduction in a force to connect the main body 41 of the housing 40 and the base body 10 in the connecting section 80 over time.

A configuration to hold the pin 82 by the main body 41 of the housing 40 is not particularly limited. The pin 82 only need not be detached from the main body 41 after the assembly of the hydraulic pressure control unit 1 is completed. For example, it may be configured that the pin 82 is hooked on a step of the main body 41. In the case where it is configured that the pin 82 is interposed between the step of the main body 41 and the base body 10, it is possible to suppress detachment of the pin 82 from the main body 41 after the assembly of the hydraulic pressure control unit 1 is completed. In this embodiment, the pin 82 is fixed to the main body 41 of the housing 40 by molding. More specifically, the pin 82 is fixed to a holding section 45 of the resinous main body 41 by molding. That is, the holding section 45 is a portion that molds the pin 82. Since the pin 82 is fixed to the main body 41 of the housing 40 by molding, the pin 82 can be held by the main body 41 at the time of forming the main body 41. Accordingly, when the pin 82 is fixed to the main body 41 of the housing 40 by molding, it is possible to reduce the assembly man-hours of the hydraulic pressure control unit 1.

In this embodiment, the pin 82 includes at least one projection 85 in a portion of the pin 82 that is molded to the main body 41 of the housing 40. The projection 85 is projected in a direction that is not parallel with a direction in which the pin 82 is press-inserted in the recess 81. As illustrated in FIG. 6 and the like, in this embodiment, the pin 82 is pressed downward and is press-inserted in the recess 81. Thus, in this embodiment, the projection 85 is projected laterally. Since the pin 82 includes the projection 85, it is possible to suppress removal of the pin 82 from the holding section 45. In this way, reliability of the connection between the base body 10 and the main body 41 of the housing 40 is improved.

In this embodiment, an end portion of the pin 82 on an opposite side from an end portion that is press-inserted in the recess 81, that is, an upper end portion 84 of the pin 82 is projected from the holding section 45 as the portion, which molds the pin 82, in the main body 41 of the housing 40. Thus, the pin 82 can be press-inserted in the recess 81 by directly pressing the pin 82. Therefore, the hydraulic pressure control unit 1 can easily be assembled.

In this embodiment, the pin 82 has a plate shape. In the case where the pin 82 has the plate shape, the pin 82 can freely and elastically deformed. Thus, the pin 82 can be press-inserted in the recess 81 while offsetting the assembly error of each of the components of the hydraulic pressure control unit 1. Therefore, when the pin 82 has the plate shape, the hydraulic pressure control unit 1 can easily be assembled.

In this embodiment, the end portion of the plate-shaped pin 82 that is press-inserted in the recess 81, that is, the lower end portion 83 of the plate-shaped pin 82 is formed with a through-hole 86. In this way, when the lower end portion 83 of the pin 82 is press-inserted in the recess 81, the lower end portion 83 of the pin 82 can elastically be deformed in the recess 81. Thus, when the lower end portion 83 of the plate-shaped pin 82 is formed with the through-hole 86, the lower end portion 83 of the pin 82 can easily be press-inserted in the recess 81. Therefore, the hydraulic pressure control unit 1 can easily be assembled.

As illustrated in FIG. 3 to FIG. 5, the hydraulic pressure control unit 1 according to this embodiment includes the at least one placement table 90 that is held by the housing 40. In this embodiment, an example in which the two placement tables 90 are provided will be described. As described above, the housing 40 according to this embodiment includes the main body 41 and the lid 48. In this embodiment, each of the placement tables 90 is held by the main body 41 of the housing 40.

At least apart of the placement table 90 is arranged below a portion of the coil housing 65 of the coil unit 60. In this embodiment, an example in which an entire portion of the placement table 90 is arranged below the upper surface portion 66 of the coil housing 65 will be described. Here, in a state before the coil unit 60 and the main body 41 of the housing 40 are connected to the base body 10, the placement table 90 supports the portion of the coil housing 65 of the coil unit 60. Thus, as long as the placement table 90 can support the coil unit 60, at least the part of the placement table 90 may be arranged below a portion of the coil housing 65 other than the upper surface portion 66. For example, a step may be provided to the side surface portion 68 of the coil housing 65, and at least the part of the placement table 90 may be arranged below the step in the side surface portion 68 of the coil housing 65. In this case, in the state before the coil unit 60 and the main body 41 of the housing 40 are connected to the base body 10, the placement table 90 can support the step in the side surface portion 68 of the coil housing 65, and the placement table 90 can thereby support the coil unit 60. In addition, as long as the part of the placement table 90 is arranged below the portion of the coil housing 65 of the coil unit 60, the rest of the placement table 90 may be arranged above the coil housing 65. For example, the placement table 90 may be held at a higher position than the coil housing 65 by the main body 41 of the housing 40. When the part of the placement table 90 is arranged below the portion of the coil housing 65 of the coil unit 60, in the state before the coil unit 60 and the main body 41 of the housing 40 are connected to the base body 10, the placement table 90 can support the coil unit 60.

Figure 7:
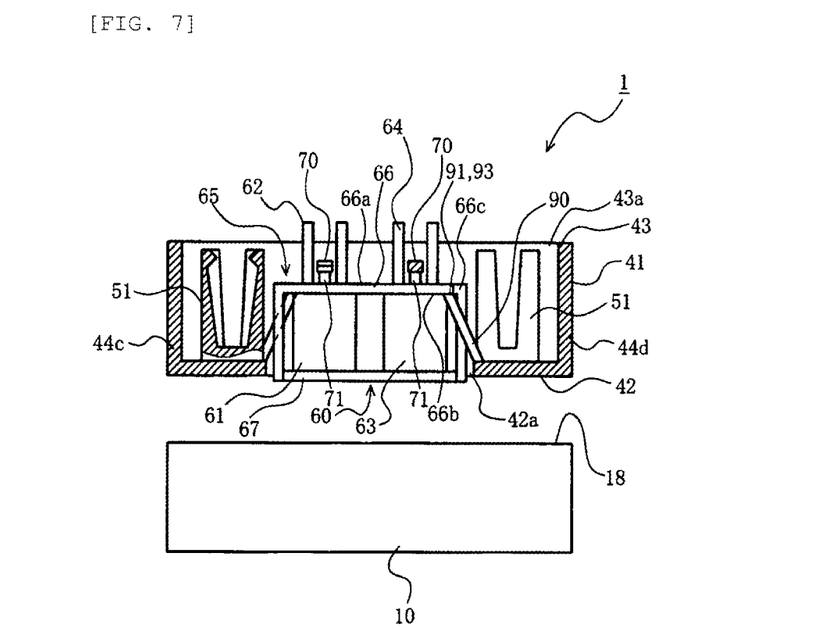
FIG. 7 is a view for explaining a state before a coil unit and a main body of a housing are connected to a base body in the hydraulic pressure control unit according to the embodiment of the present invention.

FIG. 7 is a view for explaining the state before the coil unit and the main body of the housing are connected to the base body in the hydraulic pressure control unit according to the embodiment of the present invention.

As illustrated in FIG. 7, in the state before the coil unit 60 and the main body 41 of the housing 40 are connected to the base body 10, a support section 91 of the placement table 90 supports a lower surface 66b of the upper surface portion 66 of the coil housing 65 from below. The support section 91 constitutes at least part of the portion of the placement table 90 that is arranged below the upper surface portion 66 of the coil housing 65. As described above, in this embodiment, the entire portion of the placement table 90 is arranged below the upper surface portion 66 of the coil housing 65. Thus, a lower end portion 92 of the placement table 90 is held by the main body 41 of the housing 40, and an upper end portion 93 thereof serves as the support section 91.

The conventional hydraulic pressure control unit is configured that, after the coil unit is attached to the base body, the housing is attached to the base body. Here, in order to downsize the hydraulic pressure control unit, a clearance between the coil unit and the housing has to be reduced. However, in the case where the clearance between the coil unit and the housing is reduced and the coil unit is attached to the base body at a position that is misaligned with a prescribed position, an upper portion of the coil unit interferes with a lower portion of the housing. As a result, it is difficult to assemble the conventional hydraulic pressure control unit. In addition, due to the interference between the upper portion of the coil unit and the lower portion of the housing, it is concerned that a connection terminal of the coil is bent.

Meanwhile, in the hydraulic pressure control unit 1 according to this embodiment, the placement table 90 supports the coil unit 60. In this way, both of the coil unit 60 and the main body 41 of the housing 40 can simultaneously be positioned with respect to the base body 10. Thus, in the hydraulic pressure control unit 1 according to this embodiment, even in the case where a clearance between the coil unit 60 and the main body 41 of the housing 40 is reduced, it is possible to suppress interference between an upper portion of the coil unit 60 and a lower portion of the main body 41 of the housing 40. Therefore, it is possible to downsize the hydraulic pressure control unit 1 according to this embodiment to be smaller than the conventional hydraulic pressure control unit. In addition, in the hydraulic pressure control unit 1 according to this embodiment, it is possible to suppress the interference between the upper portion of the coil unit 60 and the lower portion of the main body 41 of the housing 40. Therefore, it is also possible to suppress bending of the connection terminal 62 of the coil 61 and the connection terminal 64 of the coil 63.

Here, as illustrated in FIG. 3, in a state where the coil unit 60 and the main body 41 of the housing 40 are connected to the base body 10, a length La and a length Lb are defined as follows. The length La is a vertical length from a connected portion between the main body 41 of the housing 40 and the upper surface 18 of the base body 10 to the portion of the coil housing 65 that is supported by the support section 91 of the placement table 90. As described above, in this embodiment, the lower surface 66b of the upper surface portion 66 of the coil housing 65 is supported by the support section 91 of the placement table 90. Accordingly, in this embodiment, the length La is a vertical length from the connected portion between the main body 41 of the housing 40 and the upper surface 18 of the base body 10 to the lower surface 66b of the upper surface portion 66 of the coil housing 65. In addition, the length Lb is a vertical length from the connected portion between the main body 41 of the housing 40 and the upper surface 18 of the base body 10 to the support section 91 of the placement table 90. In the case where the length La and the length Lb are defined just as described, the length La is longer than the length Lb.

When the length La is set to be longer than the length Lb, in the state where the coil unit 60 and the main body 41 of the housing 40 are connected to the base body 10, a clearance is provided between the portion of the coil housing 65 that is supported by the support section 91 of the placement table 90 and the support section 91 of the placement table 90. As a result, in the state where the coil unit 60 and the main body 41 of the housing 40 are connected to the base body 10, the coil unit 60 is no longer pressed upward by the placement table 90. Therefore, the reliability of the adhesion between the coil unit 60 and the base body 10 is improved.

As described above, in this embodiment, the placement table 90 is arranged below the upper surface portion 66 of the coil housing 65, the lower end portion 92 thereof is held by the main body 41 of the housing 40, and the upper end portion 93 thereof serves as the support section 91. In the case where a part of the placement table 90 is provided above the upper surface portion 66 of the coil housing 65, the part of the placement table 90 is arranged in a clearance that is provided laterally between the upper surface portion 66 of the coil housing 65 and the main body 41 of the housing 40. Meanwhile, when the entire portion of the placement table 90 is arranged below the upper surface portion 66 of the coil housing 65, the part of the placement table 90 need not be arranged in the clearance that is provided laterally between the upper surface portion 66 of the coil housing 65 and the main body 41 of the housing 40. Thus, when the entire portion of the placement table 90 is arranged below the upper surface portion 66 of the coil housing 65, it is possible to reduce the clearance that is provided laterally between the upper surface portion 66 of the coil housing 65 and the main body 41 of the housing 40. Therefore, the hydraulic pressure control unit 1 can be downsized.

The hydraulic pressure control unit 1 according to this embodiment includes the plural placement tables 90. In the case where the single placement table 90 supports the coil unit 60, the placement table 90 supports a portion thereof near a position that serves as center of gravity of the coil unit 60 in a plan view. However, in the case where it is attempted to downsize the hydraulic pressure control unit 1, it may be difficult to secure a space supported by the placement table 90 near the position that serves as the center of gravity of the coil unit 60 in the plan view. Meanwhile, in the case where the plural placement tables 90 support the coil unit 60, each of the plural placement tables 90 abuts an empty space without supporting the portion near the position that serves as the center of gravity of the coil unit 60 in the plan view, and can thereby support the coil unit 60. Therefore, due to the provision of the plural placement tables 90, the hydraulic pressure control unit 1 can be downsized.

In this embodiment, the main body 41 of the housing 40 and the placement tables 90 are an integrated resin molded product. Accordingly, in the hydraulic pressure control unit 1 according to this embodiment, it is possible to eliminate an assembly process of the placement tables 90 to the main body 41 and thus to reduce the assembly man-hours.

In this embodiment, as described above, the arms 70 are provided. Accordingly, as illustrated in FIG. 7, in the state before the coil unit 60 and the main body 41 of the housing 40 are connected to the base body 10, the coil housing 65 is interposed between the arms 70 and the placement tables 90.

Thus, due to the provision of the arms 70, it is possible to stably hold the coil unit 60 in the main body 41 of the housing 40. Therefore, the hydraulic pressure control unit 1 is easily assembled. This effect is also exhibited even in the case where each of the arms 70 is formed of metal. In the case where each of the arms 70 is made of the resin, the main body 41 of the housing 40, the placement tables 90, and the arms 70 are preferably an integrated resin molded product. As a result, it is possible to eliminate an assembly process of the placement tables 90 and the arms 70 to the main body 41 of the housing 40 and thus to reduce the assembly man-hours.

Figure 8:
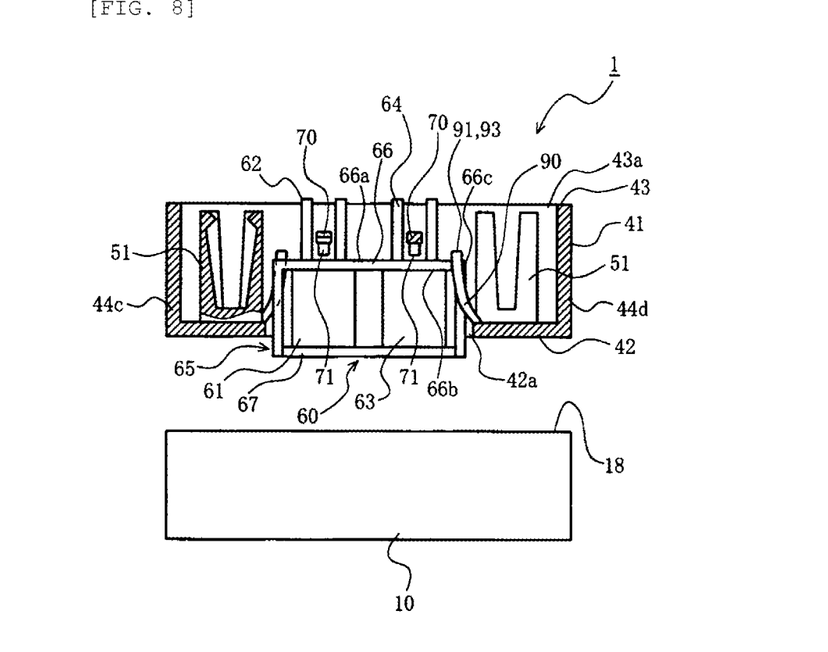
FIG. 8 is a view for explaining a process of supporting the coil unit by a placement table in the hydraulic pressure control unit according to the embodiment of the present invention.

FIG. 8 is a view for explaining a process of supporting the coil unit by the placement table in the hydraulic pressure control unit according to the embodiment of the present invention. As illustrated in FIG. 8, in this embodiment, the placement table 90 is configured to be freely and elastically deformed to a position on the outside of the coil unit 60 when the inside of the hydraulic pressure control unit 1 is observed from above. As illustrated in FIG. 4, the notch 66c is formed in the upper surface portion 66 of the coil housing 65 of the coil unit 60. In FIG. 8, the placement table 90 is configured to be freely and elastically deformed to the position on the outside of the notch 66c when the inside of the hydraulic pressure control unit 1 is observed from above. When the placement table 90 is configured just as described, a degree of freedom in design of hydraulic pressure control unit 1 is improved.

More specifically, in the case where the placement table 90 is not elastically deformed to the position on the outside of the coil unit 60 at the time when the inside of the hydraulic pressure control unit 1 is observed from above, the coil unit 60 is lowered from a position above the placement table 90, and the coil unit 60 is thereafter supported by the placement table 90. In such a case, it is necessary to consider that components arranged in the main body 41 of the housing 40 are located at positions that do not interfere when the coil unit 60 is lowered toward the placement table 90.

Meanwhile, as illustrated in FIG. 8, in the case where the placement table 90 can elastically be deformed to the position on the outside of the coil unit 60 at the time when the inside of the hydraulic pressure control unit 1 is observed from above, the coil unit 60 is lifted from a position below the placement table 90, and the coil unit 60 can thereafter be supported by the placement table 90. In detail, the coil unit 60 passes through the opening 42a, which is formed in the lower surface portion 42 of the main body 41 of the housing 40, from below and is then lifted. When the coil unit 60 keeps being lifted, the placement table 90 comes in contact with an edge of the notch 66c in the upper surface portion 66 of the coil housing 65. Along with lifting of the coil unit 60, the placement table 90 is elastically deformed to an outer side. Then, when the coil unit 60 is further lifted and the upper surface portion 66 of the coil housing 65 is located above the support section 91 of the placement table 90, the placement table 90 resumes an original shape, and the support section 91 of the placement table 90 is located below the lower surface portion 42 of the main body 41. As a result, the coil unit 60 can be supported by the placement table 90. Just as described, in the case where the placement table 90 can elastically be deformed to the position on the outside of the coil unit 60 at the time when the inside of the hydraulic pressure control unit 1 is observed from above, the coil unit 60 can be supported by the placement table 90 at both of the positions above and below the placement table 90. Therefore, the degree of freedom in the design of the hydraulic pressure control unit 1 is improved.

In the placement table 90 that can elastically be deformed to the position on the outside of the coil unit 60 at the time when the inside of the hydraulic pressure control unit 1 is observed from above, in the case where the placement table 90 is arranged below the upper surface portion 66 of the coil housing 65, where the lower end portion 92 thereof is held by the main body 41 of the housing 40, and where the upper end portion 93 thereof serves as the support section 91, the placement table 90 preferably has a shape illustrated in FIG. 5. More specifically, preferably, a lateral width of the placement table 90 is reduced upward from the lower end portion 92 to an intermediate portion 94, the lateral width thereof is increased upward from the intermediate portion 94, and the lateral width of the upper end portion 93 is greater than the lateral width of the intermediate portion 94. In the placement table 90 that is configured just as described, the lateral width is reduced upward from the lower end portion 92 to the intermediate portion 94. Thus, the elastic deformation of the placement table 90 is facilitated, and the coil unit 60 can easily be supported by the placement table 90 from the position below the placement table 90. In addition, in the placement table 90 that is configured just as described, the lateral width is increased upward from the intermediate portion 94, and the lateral width of the upper end portion 93 is greater than the lateral width of the intermediate portion 94. Thus, it is possible to increase an area of the coil housing 65 that is supported by the placement table 90. Accordingly, in the placement table 90 that is configured just as described, stability of the support for the coil unit 60 by the placement table 90 is improved. Therefore, when the placement table 90 that is configured just as described is used, the hydraulic pressure control unit 1 can easily be assembled.

As described above, the hydraulic pressure control unit according to this embodiment is configured to include the accumulator 23 that stores the brake fluid during depressurization in the anti-lock brake control and to discharge the brake fluid in the accumulator 23 to the outside of the accumulator 23 in the pumpless manner. It is desired to downsize the hydraulic pressure control unit of a pumpless type. Therefore, the hydraulic pressure control unit 1 according to this embodiment is preferably the hydraulic pressure control unit of the pumpless type.

Effects of Hydraulic Pressure Control Unit

A description will be made on effects of the hydraulic pressure control unit according to the embodiment.

The hydraulic pressure control unit 1 according to this embodiment is the hydraulic pressure control unit 1 for the brake system 100 mounted to the straddle-type vehicle that is the pedal-driven vehicle 200, for example. The hydraulic pressure control unit 1 includes the base body 10, the circuit board 31, and the housing 40. The base body 10 is formed with the channel 13 of the brake fluid. The circuit board 31 controls driving of the hydraulic pressure regulation valves 20, each of which opens/closes the channel 13. The housing 40 is connected to the base body 10 and accommodates the circuit board 31. The housing 40 includes the main body 41, the lid 48, and the lid fixing sections 50. Each of the lid fixing sections 50 is connected to the base body 10 and is formed with the opening 43a in the region that opposes the circuit board 31. The lid 48 covers the opening 43a and adheres to the main body 41. Each of the lid fixing sections 50 is provided in the space that is surrounded by the main body 41 and the lid 48, and fixes the lid 48 to the main body 41. Each of the lid fixing sections 50 includes: the engaged section 51 that is held by one of the main body 41 and the lid 48; and the engaging section 55 that is held by the other of the main body 41 and the lid 48 and engages with the engaged section 51.

In the hydraulic pressure control unit 1 configured as described above, each of the lid fixing sections 50 is provided in the space that is surrounded by the main body 41 and the lid 48. Thus, each of the lid fixing sections 50 is not projected outward from outer peripheral portions of the main body 41 and the lid 48. Therefore, it is possible to downsize the hydraulic pressure control unit 1 to be smaller than the conventional hydraulic pressure control unit by fixing the lid 48 to the main body 41 using the lid fixing sections 50.

The description has been made so far on the embodiment. However, the present invention is not limited to the description of the embodiment. For example, the embodiment may only partially be implemented.

REFERENCE SIGNS LIST

1: Hydraulic pressure control unit
10: Base body
11: Master cylinder port
12: Wheel cylinder port
13: Channel
14: First channel
15: Second channel
16: Third channel
17: Fourth channel
18: Upper surface
20: Hydraulic pressure regulation valve
21: Inlet valve
22: Outlet valve
23: Accumulator
30: Control section
31: Circuit board
32: Lower surface
33: Hole
40: Housing
41: Main body
42: Lower surface portion
42a: Opening
43: Upper surface portion
43a: Opening
44a: First side surface portion
44b: Second side surface portion
44c: Third side surface portion
44d: Fourth side surface portion
45: Holding section
48: Lid
50: Lid fixing section
51: Engaged section
52: Projection
53: Slit
55: Engaging section
56: Projection
57: Slit
58: Imaginary axis
60: Coil unit
61: Coil
62: Connection terminal
63: Coil
64: Connection terminal
65: Coil housing
66: Upper surface portion
66a: Upper surface
66b: Lower surface
66c: Notch
67: Lower surface portion
68: Side surface portion
69: Center
70: Arm
71: Projection
72: Upper surface
73: Lower surface
74: Axis
80: Connecting section
81: Recess
82: Pin
83: Lower end portion
84: Upper end portion
85: Projection
86: Through-hole
90: Placement table
91: Support section
92: Lower end portion
93: Upper end portion
94: Intermediate portion
100: Brake system
101: Fluid pipe
102: Fluid pipe
103: Hydraulic pressure sensor
200: Pedal-driven vehicle
210: Frame
211: Head tube
212: Top tube
213: Down tube
214: Seat tube
215: Stay
216: Front fork
217: Front wheel
218: Saddle
219: Pedal
220: Rear wheel
230: Turning section
231: Steering column
232: Handlebar stem
233: Handlebar
240: Brake operation section
241: Brake lever
242: Master cylinder
243: Reservoir
250: Front-wheel braking section
251: Wheel cylinder
252: Rotor
260: Rear-wheel braking section
270: Power supply unit

What is claimed is:

1. A hydraulic pressure control unit (1) for a brake system (100) mounted to a straddle-type vehicle (200), the hydraulic pressure control unit (1) comprising:
a base body (10) formed with a channel (13) of a brake fluid;
a circuit board (31) that controls driving of a hydraulic pressure regulation valve (20) opening/closing the channel (13); and
a housing (40) that is connected to the base body (10) and accommodates the circuit board (31), wherein
the housing (40) includes:
a main body (41) that is connected to the base body (10) and is formed with an opening (43a) in a region that opposes the circuit board (31);
a lid (48) that covers the opening (43a) and adheres to the main body (41); and a lid fixing section (50) that is provided in a space surrounded by the main body (41) and the lid (48) and fixes the lid (48) to the main body (41), and the lid fixing section (50) includes:

an engaged section (51) that is held by one of the main body (41) and the lid (48); and an engaging section (55) that is held by the other of the main body (41) and the lid (48) and engages with the engaged section (51), wherein the engaging section (55) is thinner than the engaged section (51), wherein the circuit board (31) is formed with a hole (33), wherein only the engaging section (55) of the lid fixing section (50) extends through the hole (33) and is inserted into and engaged with the engaged section (51) at a location between the circuit board (31) and the base body (10), and wherein the engaging section (55) or the engaged section (51) is elastically deformed when the engaging section (55) engages with the engaged section (51).

2. The hydraulic pressure control unit (1) according to claim 1, wherein the hole (33) is a position reference hole of the circuit board (31).

3. The hydraulic pressure control unit (1) according to claim 1, wherein both of the engaging section (55) and the engaged section (51) are elastically deformed when the engaging section (55) engages with the engaged section (51).

4. The hydraulic pressure control unit (1) according to claim 1, wherein the engaging section (55) extends to inside of the engaged section (51) and engages with said engaged section (51) from the inside.

5. The hydraulic pressure control unit (1) according to claim 1, wherein the one of the main body (41) and the lid (48) is a resin molded product, and the engaged section (51) and the one of the main body (41) and the lid (48) are an integrated product.

6. The hydraulic pressure control unit (1) according to claim 5, wherein the other of the main body (41) and the lid (48) is a resin molded product, and the engaging section (55) and the other of the main body (41) and the lid (48) are an integrated product.

7. The hydraulic pressure control unit (1) according to claim 1 comprising:

a plurality of the lid fixing sections (50).

8. The hydraulic pressure control unit (1) according to claim 7, wherein when the lid (48) is rotated 180° from a correct attachment position with an imaginary axis (58) that is parallel with a penetrating direction of the opening (43*a*) being a center of rotation, at least one of the engaging sections (55) of the plural lid fixing sections (50) does not engage with the engaged section (51) of any of the plural lid fixing sections (50).

9. The hydraulic pressure control unit (1) according to claim 1 further comprising:

an accumulator (23) that stores the brake fluid during depressurization in anti-lock brake control, wherein brake fluid in the accumulator (23) is discharged to outside of the accumulator (23) in a pumpless manner.

10. A brake system (100) comprising:

the hydraulic pressure control unit (1) according to claim 1.

11. A straddle-type vehicle (200) comprising:

the brake system (100) according to claim 10.

* * * * *